United States Patent [19]
Ford et al.

[11] Patent Number: 5,261,229
[45] Date of Patent: Nov. 16, 1993

[54] NOISE-SUPPRESSED EXHAUST NOZZLES FOR JET ENGINES

[75] Inventors: Eric A. Ford, Ft. Thomas, Ky.;
Jeremiah P. Wolf, Cincinnati;
Lawrence W. Dunbar, Loveland, both of Ohio

[73] Assignee: General Electric Company, Cincinnati, Ohio

[21] Appl. No.: 923,666

[22] Filed: Aug. 3, 1992

[51] Int. Cl.$^5$ .............................................. F02K 1/38
[52] U.S. Cl. ........................................ 60/262; 60/269
[58] Field of Search ............... 60/262, 269, 271, 204

[56] References Cited

U.S. PATENT DOCUMENTS

| | | | |
|---|---|---|---|
| 2,910,828 | 11/1959 | Meyer | 60/271 |
| 3,053,340 | 9/1962 | Kutney . | |
| 3,386,658 | 6/1968 | Mehr | 60/271 |
| 3,630,311 | 12/1971 | Nagamatsu et al. . | |
| 3,938,328 | 2/1976 | Klees | 60/262 |
| 4,587,806 | 5/1986 | Madden | 60/271 |
| 5,157,916 | 10/1992 | Wynosky et al. | 60/204 |

FOREIGN PATENT DOCUMENTS 2244098 11/1991 United Kingdom ................. 60/263

Primary Examiner—Richard A. Bertsch
Assistant Examiner—W. J. Wicker
Attorney, Agent, or Firm—Jerome C. Squillaro

[57] ABSTRACT

An array of chutes is permanently mounted within the flowpath of an exhaust nozzle of an aircraft jet engine for entraining and mixing ambient air with the exhaust gas so as to reduce the noise level of aircraft, particularly during take-off. In order to provide good engine performance during all modes of jet engine operation, a convergent-divergent flap assembly is arranged downstream from the chutes for controlling the nozzle throat and exit areas when the chutes are closed.

11 Claims, 7 Drawing Sheets

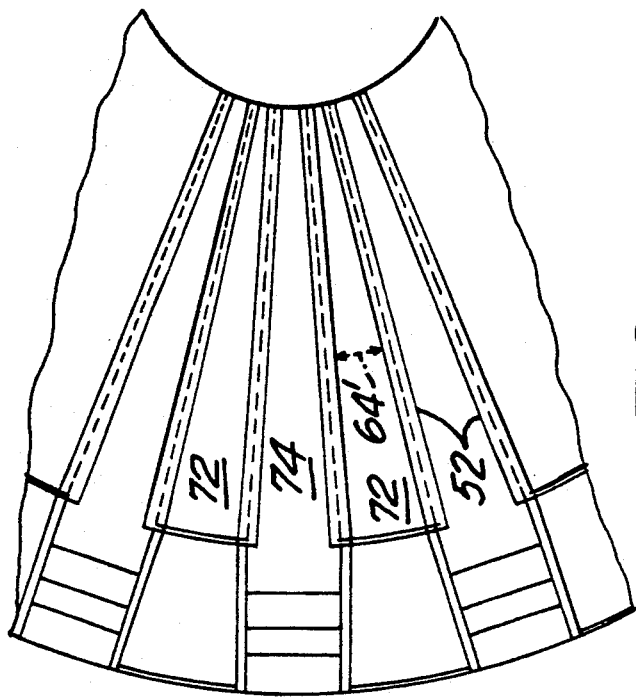
FIG.6
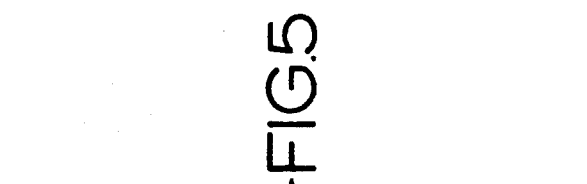
FIG.5
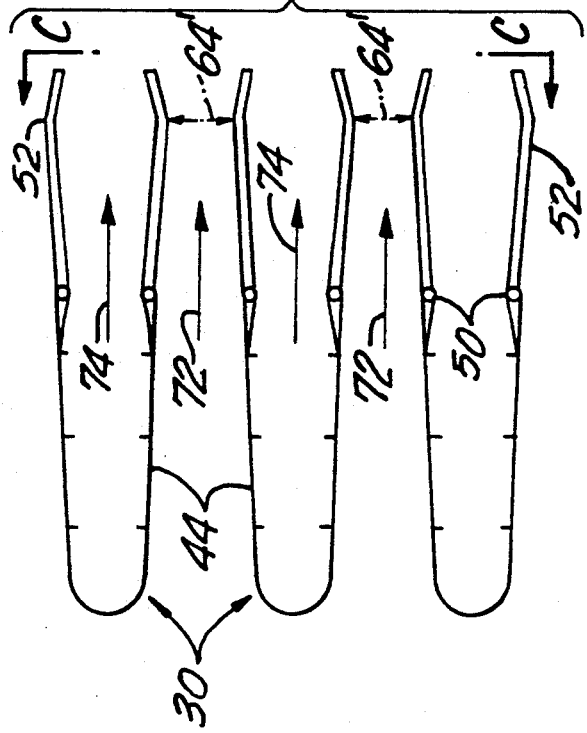
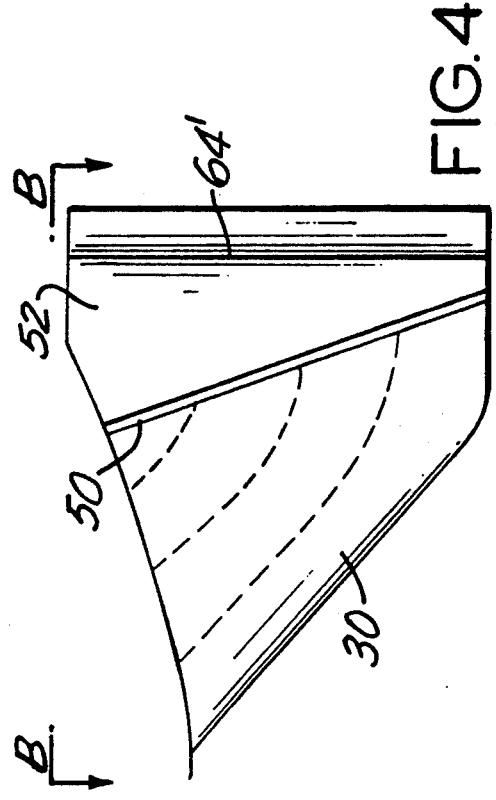
FIG.4

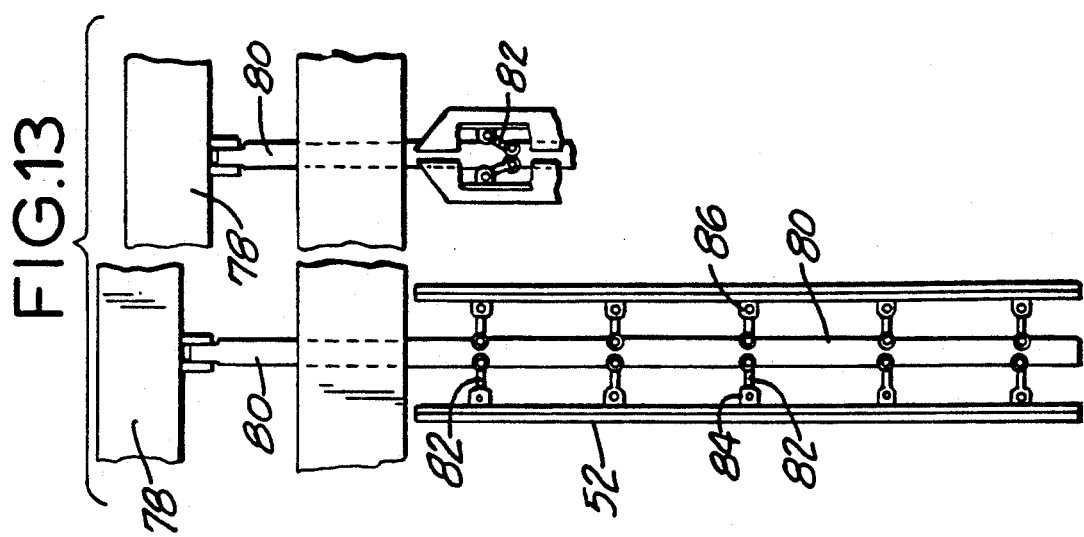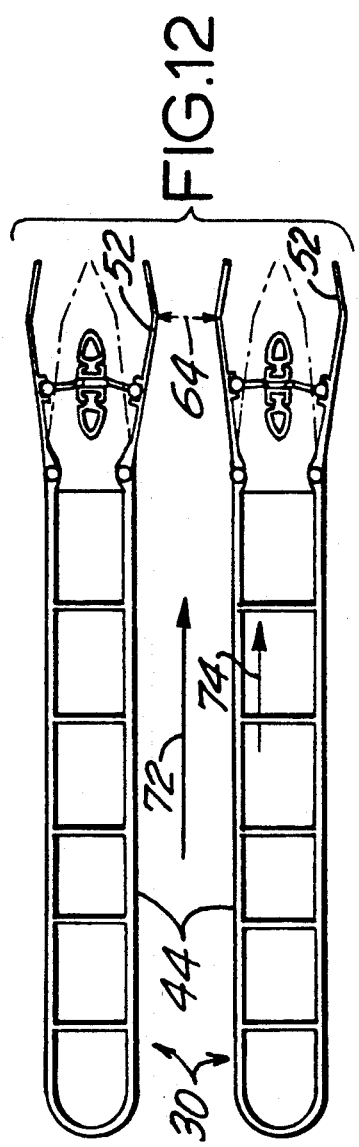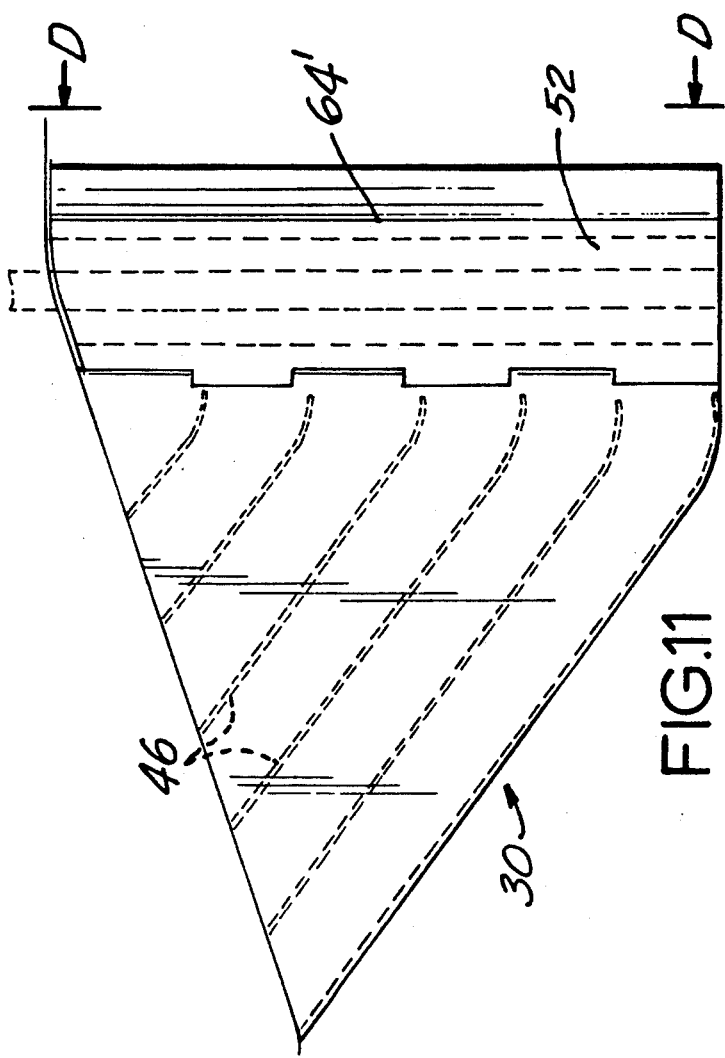

NOISE-SUPPRESSED EXHAUST NOZZLES FOR JET ENGINES

BACKGROUND OF THE INVENTION

1. Field of the Invention

The present invention relates generally to supersonic aircraft engine exhaust systems which require noise suppression and particularly relates to the provision of ejector chutes permanently mounted within the exhaust stream for mixing ambient air with the exhaust gasses.

2. Description of Prior Development

Aircraft engines designed for supersonic flight at speeds of Mach 2.0 to Mach 4.0 produce high noise levels during take-off. For commercial applications, this noise must be suppressed to meet governmental noise level limits.

One known method of noise suppression places ejector chutes in the hot exhaust gas stream to entrain ambient air and enhance mixing of the air and exhaust gas. This entrainment of air increases the total mass flow exiting the nozzle while decreasing the exit velocity of the exhaust gas. The decreased exit velocity results in lower noise levels while the increased mass flow maintains the required take-off thrust.

Previous supersonic exhaust nozzle designs employing ejector chutes for air entrainment and noise suppression have used movable chutes that were stowed out of the exhaust stream during modes of operation not requiring noise suppression such as during transonic acceleration, subsonic cruise and supersonic cruise. A problem associated with the use of such movable chutes is the limited space available for their stowage. Thus, their size and ambient air entrainment capabilities are limited.

A measure of the air entrainment capabilities of ejector chutes is defined as the blockage ratio. This is the total flow area at the downstream exit of the ejector chutes divided by the core flow throat area at take-off. An increase in the blockage ratio will tend to increase ambient air entrainment and decrease exhaust noise. For chutes stowed during non-noise suppression operation, maximum blockage ratios are approximately 2.25.

One way to increase the blockage ratio of the ejector chutes is to leave the chutes in the hot exhaust gas stream during both suppressed and non-suppressed operation. With this arrangement, a blockage ratio of approximately 3.0 can be achieved thus improving the ambient air entrainment and noise suppression.

Previous designs that have permanently maintained chutes in the hot exhaust gas stream have employed the aft ends of the chutes to vary the exhaust nozzle throat area and exhaust nozzle internal exit areas throughout take-off, acceleration, subsonic and supersonic modes of operation. Such designs have also used a fixed external nozzle exit area. This results in less than optimum performance during all modes of engine operation.

Accordingly, a need exists for an exhaust system for a high speed civil transport aircraft engine having permanently maintained ejector chutes which provide a high blockage ratio yet which also allow for good engine performance during the acceleration, subsonic and supersonic modes of operation.

SUMMARY OF THE INVENTION

The present invention has been developed to fulfill the needs noted above and therefore has as a primary object the provision of an exhaust system for a jet engine having permanently maintained ejector chutes which allow for a high blockage ratio yet which do not detract from engine performance during acceleration, subsonic operation and supersonic operation.

Another object of the invention is to provide an exhaust system for a high speed civil transport aircraft engine having permanently maintained ejector chutes which act in cooperation with movable flaps which define a first convergent-divergent exhaust nozzle.

Yet another object of the invention is to provide an exhaust nozzle which uses ejector chute flaps for defining the nozzle throat area only during noise-suppressed operation and which uses a second separate convergent-divergent flap system for defining the nozzle throat and external nozzle exit areas during other modes of engine operation.

Briefly, the invention is directed to a jet engine exhaust system having a plurality of permanently maintained ejector chutes having movable aft end portions controlling the exhaust nozzle throat area and internal nozzle exit area only during the noise-suppressed mode of engine operation. During other modes of engine operation, conventional convergent and divergent flaps control the area of the exhaust nozzle throat and external exit area for good engine performance.

This arrangement achieves the highest blockage ratios during the noise suppression mode while maintaining good engine performance during the other modes of engine operation. This dual throat nozzle system may be employed in both axisymmetric and two-dimensional convergent-divergent exhaust nozzles as described below.

By definition the throat is where the gas flow cross sectional area converges until the velocity accelerates to Mach 1. After reaching Mach 1, the gas flow expands with an increasing cross sectional area and the velocity of the gas increases during both subsonic and supersonic conditions. In each embodiment, the throat moves from one location at the chute mixing plane to the intersection of the convergent and divergent flaps. At the chute mixing plane, the area in the chutes and between the chutes converge to form the throat. This is only true during suppressed modes of operation. During other modes of operation, the chute flaps close or rotate together. This allows the cross sectional area in that section of the nozzle not to converge. The convergent section is delayed until the convergent flap section where the cross sectional area is converged.

A key to the invention is the location of the fixed chutes. The chutes are located forward of the throat where less vibration exists in a low velocity field in a lower Mach number area which reduces performance losses and fatigue on the chute parts. This is especially important during supersonic cruise when the chutes are located farther from the throat.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In The Drawings

FIG. 4 is an enlarged side elevation view of the noise suppressor chutes of FIG. 1 with the chutes opened in their noise-suppressing position;

FIG. 5 is a schematic top plan view of the noise suppressor chutes of FIG. 4 taken along line B—B thereof;

FIG. 6 is a partial aft view of the noise suppressor chutes of FIG. 5, looking forward along line C—C thereof;

FIG. 11 is an enlarged side elevation view of the noise suppressor chutes of FIG. 2 showing the chutes opened in their noise-suppressing position;

FIG. 12 is a top plan view of the noise suppressor chutes of FIG. 11 showing the chutes opened in their noise-suppressing position in solid lines and showing the chutes in their non-suppressed position phantom; and FIG. 13 is an aft view looking forward along line D—D of FIG. 11 showing the noise suppressor chutes in their suppressed and non-suppressed positions.

In the various figures of the drawing, like reference characters designate like parts.

DETAILED DESCRIPTION OF THE PREFERRED EMBODIMENTS

Figure 1:
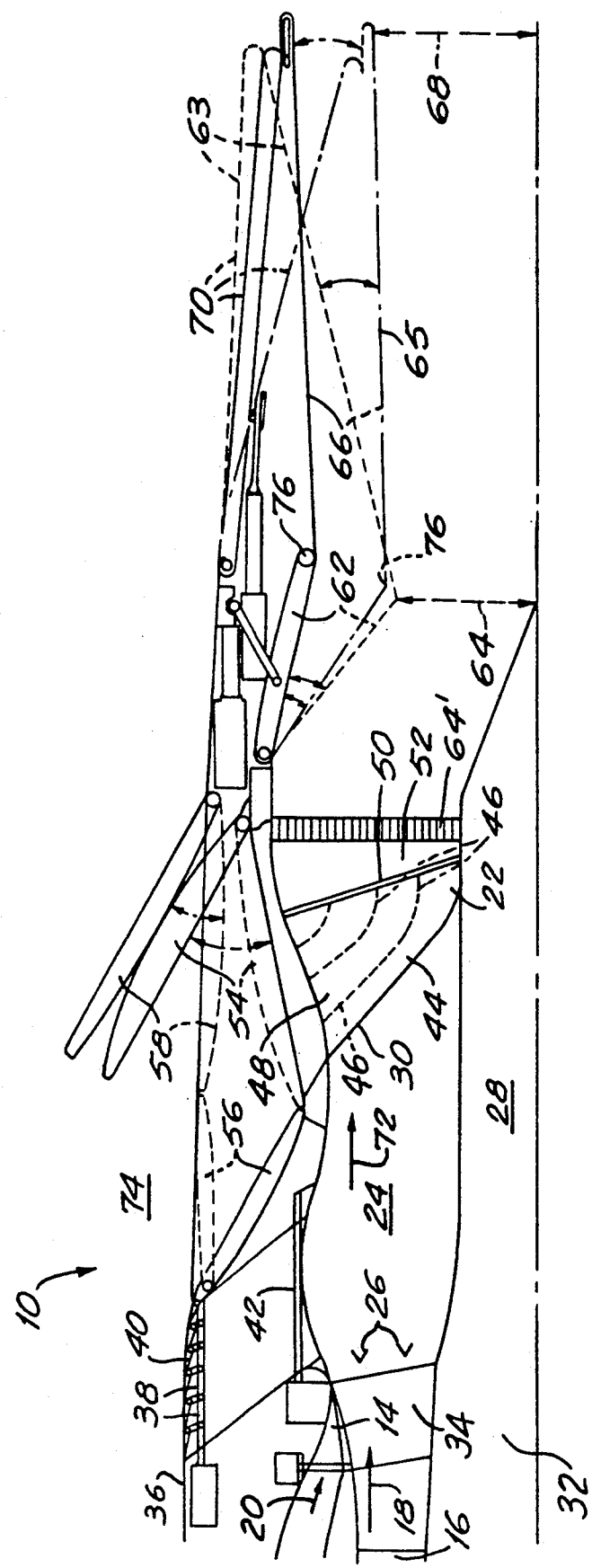
FIG. 1 is a schematic view in axial section of the upper half of an axisymmetric convergent-divergent exhaust nozzle constructed in accordance with the invention.

The present invention will now be described in conjunction with the drawings, wherein a high speed civil transport jet engine exhaust nozzle is shown in FIG. 1 as an axisymmetric convergent-divergent nozzle 10 and shown in FIG. 2 as a two-dimensional convergent-divergent nozzle 12. Each nozzle 10,12 contains noise suppressors which include chutes permanently positioned in the exhaust gas stream.

Figure 2:
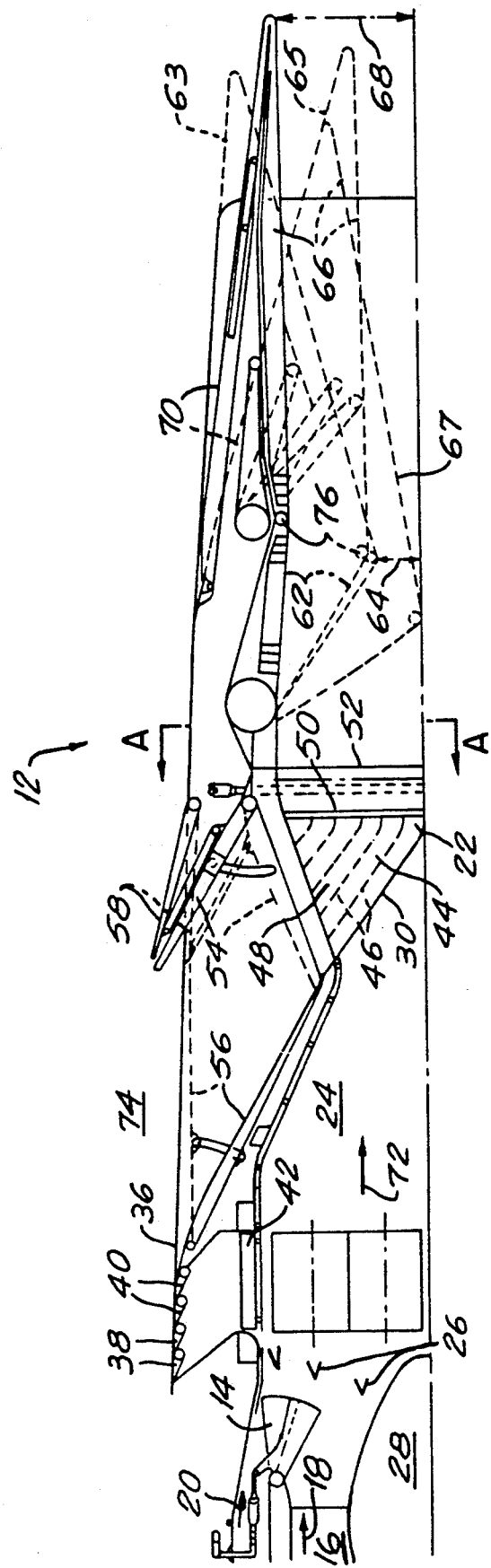
FIG. 2 is a schematic view in axial section of the upper half of a two-dimensional, convergent-divergent exhaust nozzle constructed in accordance with the invention.

The exhaust nozzles 10,12 can operate with either turbojet engines or, as shown in FIGS. 1 and 2, with bypass turbofan engines. Each exhaust nozzle 10,12 includes a variable bypass injector 14 in the form of a pivoting valve located downstream of the engine turbine frame 16 for mixing the engine core gas stream 18 with the bypass air stream 20.

The variable area bypass injector 14 can be either a confluent flow multiple door mixer as shown in FIG. 1 or a drop chute variable area bypass injector mixer as shown in FIG. 2. A conventional augmenter 26 is typically provided to add heat to the core and bypass streams 18,20 to increase the thrust relative to nonaugmented operation.

In the two-dimensional convergent-divergent nozzle design of FIG. 2, a centerbody 28 is mounted to the turbine frame 16. Centerbody 28 provides a diffusion flowpath for the core and bypass streams 18,20. In the axisymmetric design of FIG. 1, the centerbody 28 is extended aft from the turbine frame 16 to support the converging inner ends 22 of noise suppressor chutes 30, and the forward end 32 of the centerbody 28 is supported through multiple struts 34 by the outer duct casing 36.

Multiple thrust reverser ports 38 are provided in each nozzle configuration of FIGS. 1 and 2 for discharge of the core gas and bypass air streams 18,20 to effect reverse thrust during landing. The thrust reverser ports 38 are composed of multiple vanes 40 that form, in their stowed position, the outer cover of the turbojet engine and provide for efflux directivity during reverse thrust operation. The thrust reverser ports 38 further include multiple inner doors 42 that seal the inner flowpath 24 in their stowed position and provide an opening for reverse exhaust flow during reverse thrust operation.

In each example, each noise suppressor chute 30 includes a fixed chute portion 44 with ambient air flow guides 46 that guide the flow through the chute and also support the fixed chute sidewalls 48. A chute hinge 50 and aft hinged flap 52 are pivotally connected to each aft end portion of the fixed chute portion 44 of each noise suppressor chute 30. Pivotal movement of flaps 52 meters the amount of ambient air entrained within the exhaust gasses flowing through the nozzles and provides the engine exhaust gas throat area and internal area ratio for the noise-suppressed mode of operation.

The noise suppressor chutes 30 are provided with chute inlet cover doors 54 that prevent the core gas stream 18 from escaping the inner flowpath 24 during normal unsuppressed noise operation. Ambient air inlet doors 56 and 58 open to admit ambient air to the noise suppressor chutes 30 during noise-suppressed operation and close to form the outer surface of the engine during non-suppressed operation.

Convergent flaps 62 are actuated to form a variable area nozzle throat 64 during non-suppressed operation. During noise-suppressed operation, such as during take-off, another nozzle throat 64' is formed in and defined by a portion of the aft hinged flaps 52 of the noise suppressor chutes 30. At this time, the divergent flaps 66 are actuated to form the nozzle exit area 68 while outer flaps 70 are actuated to form the outer boat tail surface of the exhaust nozzles 10,12.

As represented by phantom position 63 in FIG. 1, during supersonic cruise operation, the convergent-divergent position of nozzle 10 formed by convergent flaps 62 and divergent flaps 66 defines nozzle throat 64 along the interconnection of flaps 62 and 66 at the trailing edges 76 of convergent flaps 62. The solid line configuration of flaps 62 and 66 in FIG. 1 represents the flap positions during noise-suppressed take-off while phantom position 65 represents the convergent-divergent nozzle position during subsonic flight operation.

The same phantom position references 63,65 represent the same operating conditions in FIG. 2, with the solid line configuration representing the take-off position of nozzle 12. Phantom position 67 in FIG. 2 represents the reverse thrust position of the convergent-divergent flaps 62,66. As further seen in FIGS. 1 and 2, neither exhaust system includes a nozzle plug as is common in many conventional exhaust systems.

Figure 3:
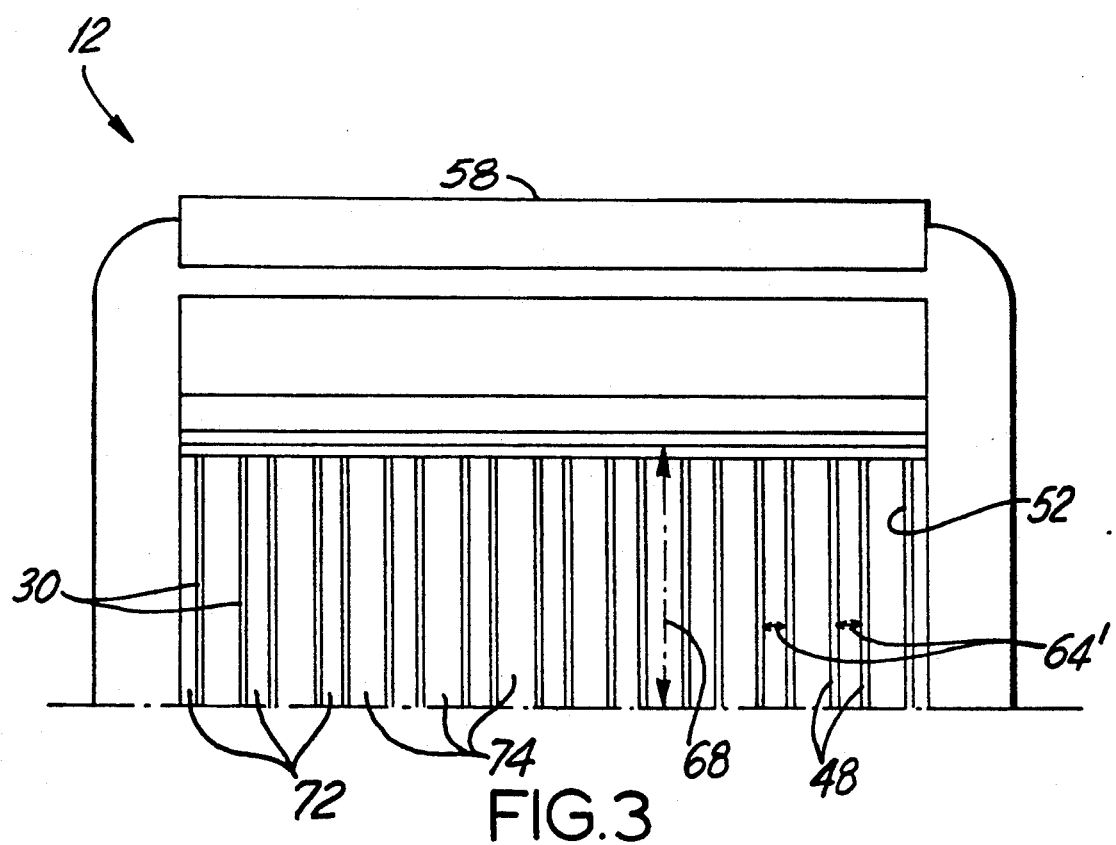
FIG. 3 is a sectional view taken along line A—A of FIG. 2.

FIG. 3 shows a view of the two-dimensional convergent-divergent exhaust nozzle of FIG. 2 from an aft position looking forward with the nozzle 12 in the noise-suppressed mode. The mixed core and bypass gas 72 passes through the first throat 64' formed by the aft hinged flaps 52. Ambient air 74 passes through the noise suppressor chutes 30 and mixes with the core and bypass gas 72 downstream of the noise suppressor chutes to effect noise suppression.

FIGS. 4 through 10 show the axisymmetric nozzle chutes 30 in more detail. In FIGS. 4, 5 and 6, the aft hinged flaps 52 are in their open, noise-suppressed position. The engine core and bypass gas 72 passes through the throat 64' and the ambient air 74 passes through the noise suppressor chutes 30. These two streams mix downstream of the aft hinged flaps 52.

Figure 8:
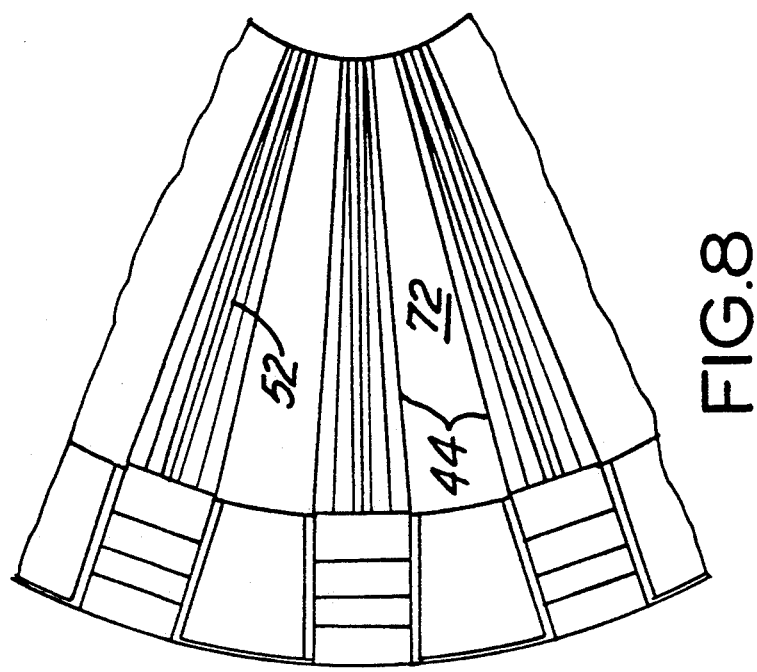
FIG. 8 is a view similar to FIG. 6 showing the noise suppressor chutes in their closed position.
Figure 7:
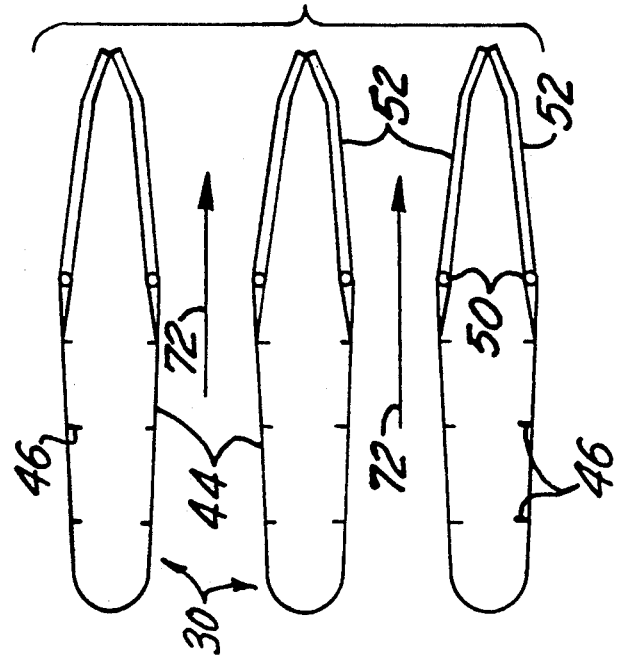
FIG. 7 is a view similar to FIG. 5 showing the noise suppressor chutes in their closed non noise-suppressing forward thrust position.

As seen in FIGS. 7 and 8, the mutually engageable and disengageable aft flaps 52 are pivoted into their closed position for a non-suppressed forward thrust mode of operation. During this mode, the Mach number of the maximum flow of engine core and bypass gas 72 through the chutes 30 is about 0.5 as the second nozzle throat 64 is defined at the trailing edge 76 of the convergent flaps 62 (FIG. 1). The aft flaps thus act as flow control members.

Figure 10:
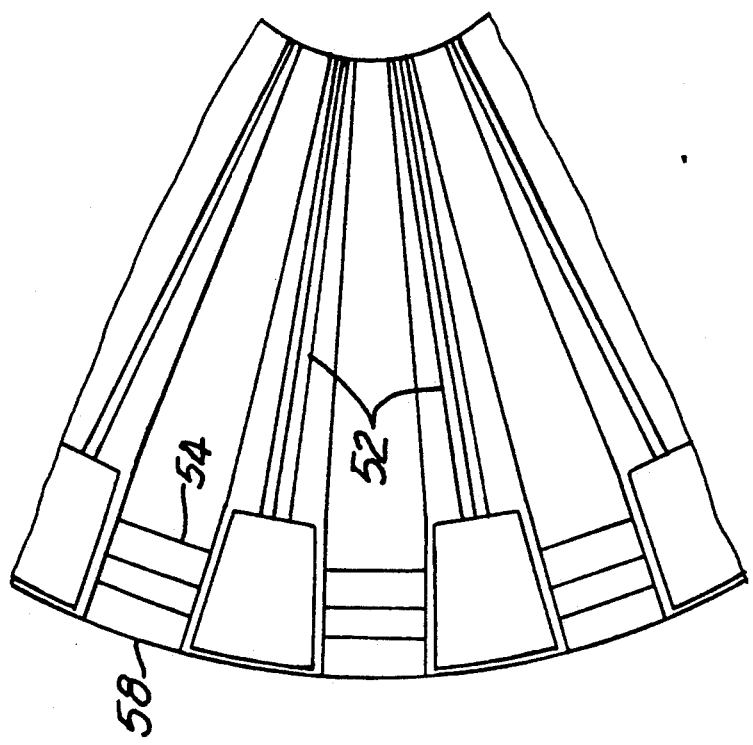
FIG. 10 is a view similar to FIG. 6 showing the noise suppressor chutes in their thrust reverse position.
Figure 9:
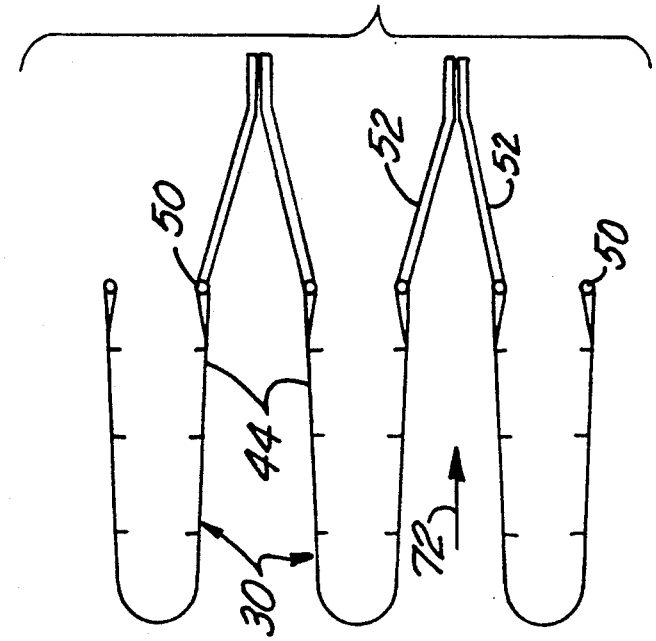
FIG. 9 is a view similar to FIG. 5 showing the noise suppressor chutes in their thrust reverse position; this position blocks the flow from exiting the convergent-divergent nozzle and thus diverts the flow to the thrust reverser.

In FIGS. 9 and 10, the aft flaps 52 are pivoted into their reverse thrust position where they act as a blocker for the engine core and bypass gas 72 which is discharged through the reverser ports 38 (FIG. 1). The ambient air inlet doors 56,58 and the chute inlet cover doors 54 are closed during thrust reverse operation.

The chutes 30 for the two-dimensional convergent-divergent nozzle of FIG. 2 are shown in further detail in FIGS. 11 through 14. In FIG. 12, the chutes 30 are shown with the aft flaps 52 pivoted into their noise-suppressed position in solid lines and in their non-suppressed position in phantom. In the two-dimensional convergent-divergent nozzle 12, the convergent flaps 62 are used for the thrust reverser blocking function instead of the aft hinged flaps 52 as in the axisymmetric nozzle of FIG. 1 in order to minimize the structural loading on the aft hinged flaps. For the suppressed and non-suppressed modes of operation, the modes of operation of the noise suppressor chutes 30 are similar to those of the axisymmetric nozzle of FIG. 1.

An example of one method of actuation of the aft hinged flaps 52 is shown in FIG. 13 and 14 wherein a distributed load is applied to the aft hinged flaps to allow their thickness and weight to be reduced or minimized. A horizontal actuation bar 78 is linked to a plurality of vertical bars 80 which in turn are connected by multiple position pivot links 82 to the aft hinged flaps 52.

Each pivot link 82 includes pivot joints 84,86 at its interconnection with vertical bar 80 and hinged flap 52. Up and down movement of actuation bar 78 respectively pivots the aft hinged flaps 52 between their open and closed positions. Thus, the hinged flaps serve as an independently actuated exhaust nozzle located upstream from the convergent-divergent exhaust nozzle defined by flaps 62,66.

The coordination of the movement of the aft hinged flaps 52 with the setting or positioning of the convergent-divergent flaps 62,66 may be controlled by an electronic control system such as that presently developed by the assignee of the subject invention and known as a FADAC system. Conventional hydraulic, electric or air driven actuators may be employed with the FADAC system.

Advantages of the exhaust nozzles described above include the attainment of a larger suppressor chute blockage ratio than that available with movable suppressor chutes. The exhaust nozzles 10,12 provide entrainment of large amounts of ambient air which in turn provides adequate sound suppression to meet current government noise level limits. The independently variable exhaust nozzle throat and exit areas provide good performance during the non-noise suppression modes of operation such as transonic acceleration and subsonic and supersonic cruise. There has been disclosed heretofore the best embodiment of the invention presently contemplated. However, it is to be understood that various changes and modifications may be made thereto without departing from the spirit of the invention. For example, the number of suppression chutes can vary. The suppression chutes can also be convergent-divergent in shape and can have straight or wavy trailing edges for increasing their mixing perimeter.

What is claimed is:

1. An exhaust system for reducing noise levels of a jet engine by admitting ambient air through an opening in an outer duct casing and into a core engine gas stream, comprising:

chute means permanently fixed in a predetermined position within said core engine gas stream for entraining said ambient air within exhaust gasses flowing through said core engine gas stream, said chute means separating said ambient air into a plurality of flowstreams;

first variable area convergent-divergent nozzle means operatively associated with said chute means and defining a first variable area nozzle throat for selectively controlling mixing of said ambient air with said exhaust gasses; and second convergent-divergent nozzle means comprising means for defining a second variable area nozzle throat disposed downstream from said chute means and downstream from said first variable area convergent-divergent nozzle means.

2. The exhaust system of claim 1, wherein said second convergent-divergent nozzle means comprises an axisymmetric nozzle.

3. The exhaust system of claim 1, wherein said second convergent-divergent nozzle means comprises a two-dimensional nozzle.

4. The exhaust system of claim 1, wherein said chute means comprises metering means for controlling the amount of said ambient air entrained within said exhaust gasses.

5. The exhaust system of claim 4, wherein said metering means comprises flap means pivotally mounted to said chute means.

6. The exhaust system of claim 1, wherein said second convergent-divergent nozzle means further comprises flap means for defining a variable area nozzle exit disposed downstream from said second variable area nozzle throat.

7. An exhaust nozzle system for a jet engine and the like, comprising:

first convergent-divergent nozzle means for entraining ambient air with engine core exhaust gas and for defining a first variable area nozzle throat during predetermined periods of engine operation, said first nozzle means comprising a plurality of movable mutually-engageable and disengageable flow control members defining a plurality of ambient air flowpaths spaced between a plurality of core engine exhaust gas flowpaths; and second convergent-divergent nozzle means disposed downstream from said first nozzle means for defining a second variable area nozzle throat during periods other than said predetermined periods.

8. The exhaust system of claim 7, wherein said first nozzle means comprises chute means permanently mounted in a fixed location within said jet engine.

9. The exhaust system of claim 8, wherein said flow control members comprise flap means for controlling the amount of said ambient air entrained within said exhaust gas, and wherein said second nozzle means comprises a convergent-divergent flap system.

10. An exhaust system for reducing noise levels of exhaust gasses issuing from an exhaust flowpath of a jet engine, comprising:

chute means having a plurality of sidewalls permanently fixed in position within said jet engine and extending into said exhaust flowpath, said chute means defining a plurality of ambient air flowpaths spaced apart within said exhaust flowpath and permanently dividing said exhaust flowpath into a plurality of exhaust gas flowpaths spaced between said ambient air flowpaths;

flow control means operatively associated with said chute means for varying the flow of said ambient air through said ambient air flowpaths and for varying the flow of said exhaust gasses through said exhaust gas flowpaths, said flow control means comprising means for varying the cross sectional areas of said ambient air flowpaths and said exhaust gas flowpaths so as to define a first variable area nozzle throat; and convergent-divergent nozzle means located downstream of said flow control means and comprising means for defining a second variable area nozzle throat.

11. A noise suppressing chute assembly for admitting ambient air through an outer duct casing of a jet engine and mixing said ambient air with exhaust gasses flowing through an exhaust path within said jet engine, said assembly comprising:

a plurality of spaced apart chute sidewalls permanently fixed in position within said jet engine and extending into said exhaust path for guiding said ambient air received from said outer duct casing and channeling said ambient air into said exhaust path;

a plurality of mutually engageable and disengageable flow control members located downstream from said chute sidewalls for selectively defining a first variable area nozzle throat; and convergent-divergent nozzle means disposed downstream of said flow control means for selectively defining a second variable area nozzle throat.

* * * * *